United States Patent
Tourrilhes et al.

(10) Patent No.: US 11,038,834 B2
(45) Date of Patent: Jun. 15, 2021

(54) SELECTING AN EXTERNAL LINK OF A PLURALITY OF EXTERNAL LINKS

(71) Applicant: Hewlett Packard Enterprise Development LP, Houston, TX (US)

(72) Inventors: Jean Tourrilhes, Mountain View, CA (US); Puneet Sharma, Palo Alto, CA (US); Yang Zhang, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 11 days.

(21) Appl. No.: 15/884,862

(22) Filed: Jan. 31, 2018

(65) Prior Publication Data
US 2019/0238497 A1 Aug. 1, 2019

(51) Int. Cl.
| H04L 29/12 | (2006.01) |
| H04L 12/751 | (2013.01) |
| H04L 12/24 | (2006.01) |
| H04L 12/741 | (2013.01) |
| H04L 12/707 | (2013.01) |
| H04L 12/54 | (2013.01) |

(52) U.S. Cl.
CPC ........ *H04L 61/106* (2013.01); *H04L 12/5692* (2013.01); *H04L 41/0803* (2013.01); *H04L 45/02* (2013.01); *H04L 45/22* (2013.01); *H04L 45/74* (2013.01); *H04L 61/2015* (2013.01); *H04L 61/2514* (2013.01); *H04L 61/2592* (2013.01); *H04L 61/6068* (2013.01)

(58) Field of Classification Search
CPC ............... H04L 61/106; H04L 61/2514; H04L 61/2592; H04L 61/6068; H04L 61/2015; H04L 12/5692; H04L 41/0803; H04L 45/02; H04L 45/22; H04L 45/74

See application file for complete search history.

(56) References Cited

U.S. PATENT DOCUMENTS

| 8,811,329 | B2 | 8/2014 | Haddad |
| 9,742,628 | B2 | 8/2017 | Kim et al. |
| 10,523,556 | B2 * | 12/2019 | Mehta ................... H04L 45/127 |
| 10,560,525 | B2 * | 2/2020 | Gopinath ............ H04L 67/1095 |

(Continued)

OTHER PUBLICATIONS

Nakasan, C. et al., A Simple Muitipath Openflow Controller Using Topology-based Algorithm for Muitipath TCP, (Research Paper), Sep. 28, 2015, 8 Pgs.

(Continued)

*Primary Examiner* — Kristie D Shingles
(74) *Attorney, Agent, or Firm* — Brooks, Cameron & Huebsch, PLLC

(57) ABSTRACT

An example system may comprise a set of network devices in a network topology, the network topology having a plurality of external links that connect to other networks, wherein the system comprises a processing resource to: assign multiple Internet Protocol (IP) addresses to one of the network interfaces of a client device; communicate the multiple IP addresses to a network interface of the client device; receive a packet from the one of the network interfaces, wherein the packet includes a source address that is one of the multiple IP addresses; select an external link of the plurality of external links based on the source address of the packet; and forward the packet via the external link of the plurality of external links.

18 Claims, 6 Drawing Sheets

(56) References Cited

U.S. PATENT DOCUMENTS

| | | | |
|---|---|---|---|
| 10,681,131 B2* | 6/2020 | Tumuluru | G06F 9/5027 |
| 10,700,982 B2* | 6/2020 | Bajaj | H04L 43/16 |
| 2005/0083844 A1* | 4/2005 | Zhu | H04L 45/04 |
| | | | 370/230.1 |
| 2006/0126613 A1 | 6/2006 | Zweig | |
| 2007/0248085 A1* | 10/2007 | Volpano | H04L 29/12028 |
| | | | 370/389 |
| 2010/0332681 A1 | 12/2010 | Wada | |
| 2016/0037428 A1 | 2/2016 | Kanugovi et al. | |
| 2016/0132805 A1* | 5/2016 | Delacourt | G06Q 10/06313 |
| | | | 705/7.23 |
| 2016/0182626 A1* | 6/2016 | Endahl | G06F 16/178 |
| | | | 709/203 |
| 2016/0261722 A1 | 9/2016 | Paasch et al. | |
| 2016/0309534 A1 | 10/2016 | Teyeb et al. | |
| 2018/0295134 A1* | 10/2018 | Gupta | H04L 63/10 |

OTHER PUBLICATIONS

European Search Report and Search Opinion Received for EP Application No. 18205700.0, dated Apr. 25, 2019, 11 pages.

* cited by examiner

SELECTING AN EXTERNAL LINK OF A PLURALITY OF EXTERNAL LINKS

BACKGROUND

A communications network can include nodes such as switches, routers, Wi-Fi access points, telecommunications towers, gateways, client devices, etc. Wide Area Networks ("WAN") are a type of communications network that can be implemented over large distances such as for a connection between a central office and a branch office or for connections between data centers of an enterprise.

DETAILED DESCRIPTION

Figure 1:
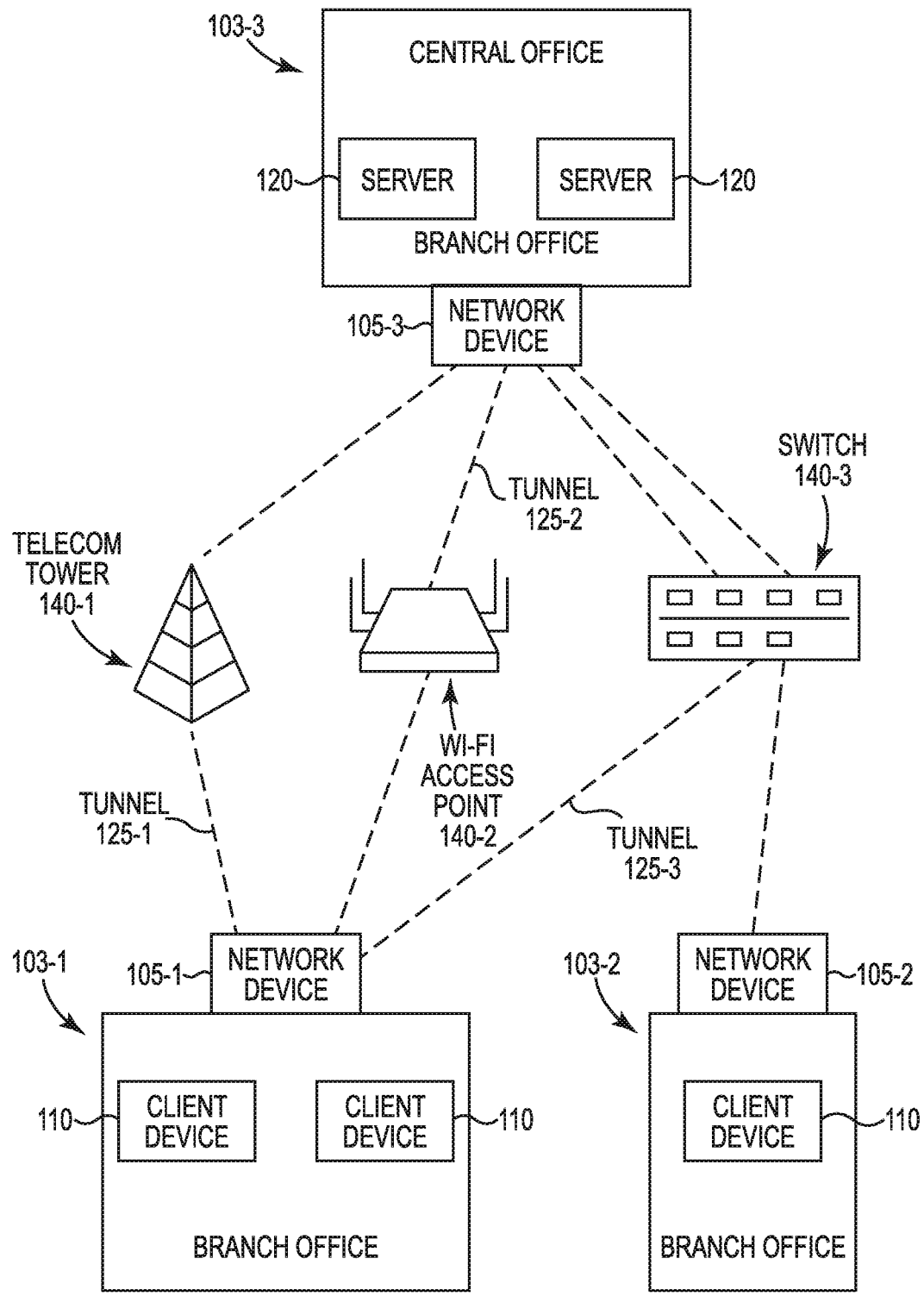
FIG. 1 illustrates an example environment in which systems or methods consistent with the disclosure may be implemented.

In a number of examples, a Wide Area Network ("WAN") can be used to facilitate communication over large distances, such as between the various branch offices of an enterprise that may be located in different cities or between a branch office and a central office. Routers, switches, gateways, among other network devices may interconnect client devices (e.g., laptops, desktop computers, etc.) that are in different locations using a Virtual Private Network ("VPN"). The VPN may be implemented within the WAN over dedicated lines of a multiprotocol label switching ("MPLS") infrastructure provided by an internet service provider. MPLS is a technique for routing packets that directs data from one network node or device to the next based on short path labels rather than long network addresses, avoiding complex lookups in a routing table at each node. Implementing a VPN within a WAN using MPLS can be costly because of the need for expensive dedicated links.

In a number of examples described herein, Software Defined WAN (SD-WAN) replaces those dedicated links by tunnels over the Internet. In this case, each branch has WAN links connected to the Internet, and a router in each branch can create private tunnels over the Internet to connect to other branches and locations. This reduces the need for expensive dedicated lines.

Within a SD-WAN, at least one client device may be in communication with a server or a network device that connects to a server based on transmission control protocol (TCP) through a single link, such as Ethernet. A number of examples provide multi-path TCP (MPTCP) for a SD-WAN such that a client device can connect to a server using multiple links simultaneously. For example, a client device such as a smartphone may connect to a server using both its LTE connection and a WiFi connection simultaneously, thus providing increased bandwidth and increased redundancy. In some examples of the disclosure, MPTCP for SD-WAN is implemented using multiple paths or subflows based on IP addresses taken from multiple subnetworks provided to a network interface of a client device. When the network device receives a packet from the client device, the network device determines a source subnetwork associated with the packet. Then, the network device chooses an external link to forward the packet based on a source subnetwork associated with the packet. The packet is forwarded to other LANs via the external link associated with the packet. In other examples, a particular external link is chosen based on a source private IP address associated with the packet, the source private IP address being one of a plurality of private IP addresses provided to a network interface of a client device. In still other examples, a particular external link is chosen based on a source TCP port number of a packet.

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

FIG. 1 illustrates an example environment in which systems or methods consistent with the disclosure may be implemented. A WAN 100 may include a plurality of local area networks ("LANs"), such as LAN 103-1, LAN 103-2, and LAN 103-3, each of which may be in different locations, such as different offices of an enterprise. In the illustrated example, the LAN 103-1 is a communications network of a branch office, the LAN 103-2 is a communications network of another branch office located in another city, for instance, and the LAN 103-3 is a communications network of a central office located in a third city, as an example.

Each local area network may include at least one client device in communication with one another and in communication with a gateway or other network device that connects the local area network to the rest of the wide area network. In FIG. 1, for instance, the LAN 103-1 includes a network device 105-1 and two client devices 110. A network device may include a device capable of receiving, transmitting, processing, routing, and/or providing packets traversing WAN 100. For example, network device 105-1 may refer to at least one traffic transfer device, such as a gateway, a switch, a router, a server, a hub, a bridge, a network interface card (NIC), an optical add-drop multiplexer (OADM), or the like. A packet may refer to a communication structure for communicating information, such as a protocol data unit (PDU), a packet, a frame, a datagram, a segment, a message, a block, a cell, a frame, a subframe, a slot, a symbol, a portion of any of the above, or another type of formatted or unformatted unit of data capable of being transmitted via a network. A client device may include a device capable of receiving inputs and providing outputs to a human user and capable of communicating with a network device 105-1. For example, client device 110 of LAN 103-1 may refer to at least one computing device, such as a desktop computer, smartphone, notebook, tablet, touchscreen device, a computing device embedded within an automobile or another machine, or the like.

As further shown in FIG. 1, the LAN 103-2 includes a network device 105-2 and another client device 110. The LAN 103-3 associated with the central office includes two servers 120 and a network device 105-3, as illustrated. A server may include devices capable of providing or receiving data from computers or systems over a local area network or a wide area network such as WAN 100. For example, the server 120 may refer to at least one storage device such as a database server, a file server, a mail server, a print server, a web server, a game server, an application server, etc. implemented in a centralized physical location or in the cloud.

As shown in FIG. 1, LAN 103-1 is in communication with LAN 103-3 via three tunnels 125-1, 125-2, and 125-3. Tunnel 125-1 is implemented over a telecommunications connection such as an LTE or 4G connection facilitated by a telecommunications tower 140-1 and connects network device 105-1 and network device 105-3, thus establishing a connection between LAN 103-1 and LAN 103-3. As further shown in FIG. 1, Tunnel 125-2 is implemented over a wireless internet connection facilitated by a WiFi access point 140-2 using the 900 MHz or 2.4 GHz, 3.6 GHz, 5 GHz, 60 GHz frequency bands. The tunnel 125-2 connects network device 105-1 and network device 105-3, thus establishing a second connection between LAN 103-1 and LAN 103-3. The tunnel 125-3 is implemented over an Ethernet connection facilitated by a switch 140-3 and connects network device 105-1 with network device 105-3, and thereby establishes a third connection between LAN 103-1 and LAN 103-3. In alternative implementations, fewer or more than three tunnels may be used to interconnect LAN 103-1 and LAN 103-3 using the above described connection methods or other connection methods. As further shown in FIG. 1, LAN 103-2 is in communication with LAN 103-3 via an Ethernet connection between network device 105-2 and network device 105-3, facilitated by a switch 140-3 deployed therebetween.

The three connections between LAN 103-1 and LAN 103-3 may be controlled or managed by an application implemented on firmware, software, or some combination of the two. Such a software defined wide area network (SD-WAN) between LAN 103-1 and LAN 103-3 provides redundancy and increased bandwidth between LAN 103-1 and LAN 103-3. For example, if tunnel 125-1 becomes disrupted or disconnected, data can still be transferred using tunnel 125-2 and tunnel 125-3, thereby ensuring that network device 105-1 remains in communication with network device 105-3. This, in turn, means that a server 120 of the LAN 103-3 continues to serve data to a client device 110 of the LAN 103-1 despite a disruption in service in at least one connection between LAN 103-1 and LAN 103-3.

Figure 2:
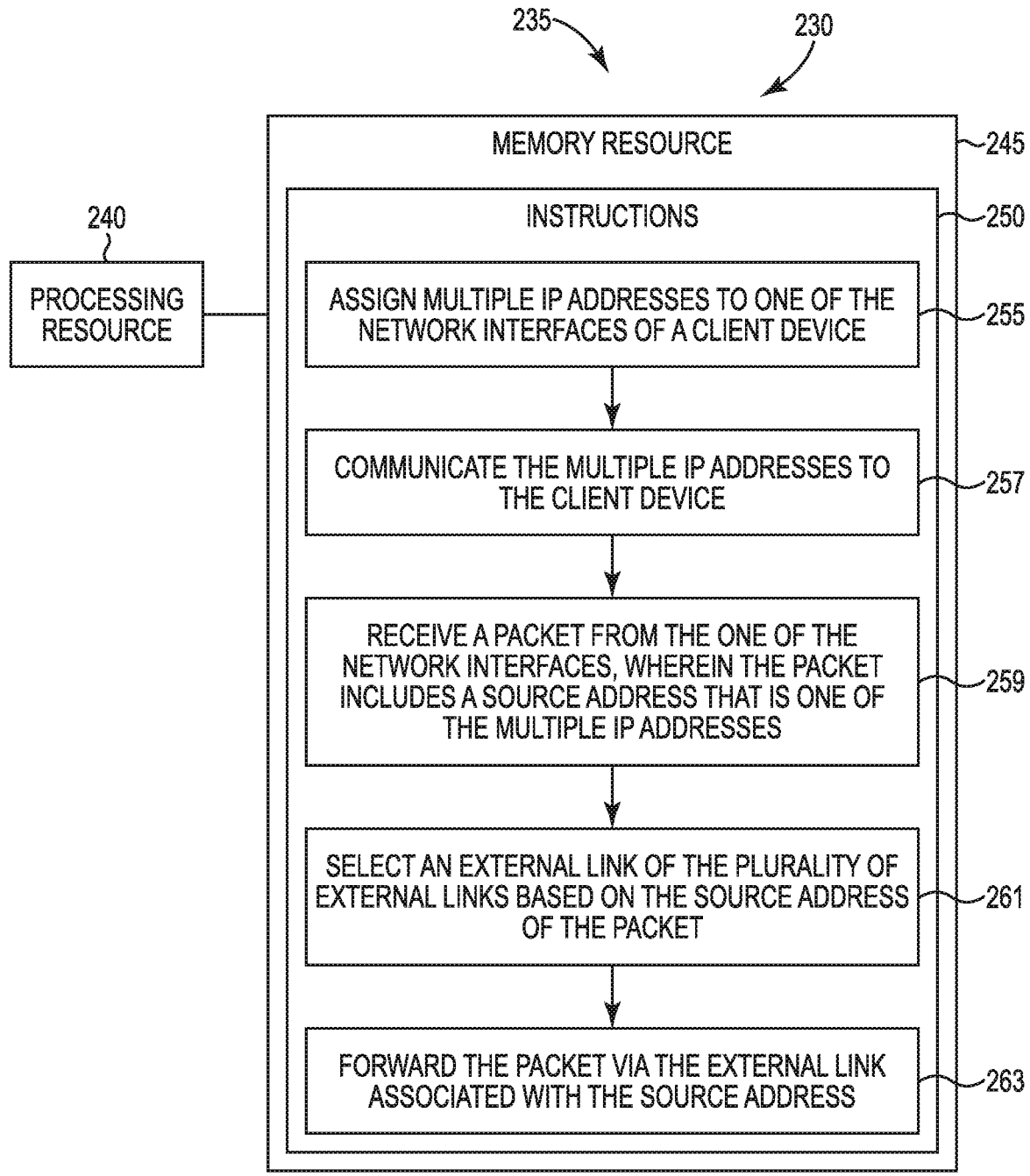
FIG. 2 illustrates an example of a system for using multiple paths for Wide Area Networks ("WAN") consistent with the disclosure.

FIG. 2 illustrates an example of a system 230 consistent with the disclosure. The system 230 may include a network device 105, a client device 110, or a network 235 that includes a plurality of network devices 105 or client devices 110 arranged in a network topology. The network devices 105 (i.e., gateways, routers, switches, etc.) that are a part of the network 235 may be interconnected with one another by optical fiber, coax cable, Long Term Evolution (LTE) communication, Ethernet, or another method of communication. As shown in FIG. 2, the system 230 includes a processing resource 240 and a memory resource 245.

The processing resource 240 may be a hardware processing unit such as a microprocessor, application specific instruction set processor, coprocessor, network processor, or similar hardware circuitry that can cause machine-readable instructions to be executed. The memory resource 245 may be any type of volatile or non-volatile memory or storage, such as random-access memory (RAM), flash memory, read-only memory (ROM), storage volumes, a hard disk, or a combination thereof.

The memory resource 245 may store instructions 250 thereon. When executed by the processing resource 240, the instructions 250 may cause the system 230 to perform specific tasks and/or functions. For example, at block 255, the memory resource 245 may store instructions 250 which may be executed by the processing resource 240 to cause the system 230 to assign multiple internet protocol ("IP") addresses to a network interface, of a plurality of network interfaces of a client device 110 of the LAN 103-1. The system 230 may be connected to other networks via external links through which packets destined for other networks are forwarded. The public IP address range allocated for forwarding packets to the system 230 may be partitioned into a set of public IP address spaces, each public IP address space of the set of IP address spaces being associated with a corresponding one of the external links of the system 230. The public IP address space of a particular external link is further subdivided into subnetworks, each of which contain multiple IP addresses. The multiple IP addresses assigned by the system 230 to a network interface of the client device 110 include IP addresses taken from different subnetworks of different external links. For example, if external link 1 is allocated subnetworks A, B, C, D and external link 2 is allocated subnetworks E, F, G, H, the system 230 assigns one of a first set of sixteen IP addresses taken from subnetwork A and one of a second set of sixteen IP addresses taken from subnetwork F to a single network interface of a client device 110. In this way, the client device 110 may be aware of the multiple paths available for forwarding network traffic originating from client device 110. Additionally, or alternatively, the multiple IP addresses assigned by the system 230 to the client device 110 may be private IP addresses selected or generated by the client device 110.

At block 257, the memory resource 245 may store instructions 250 that may be executed by the processing resource 240 to cause the system 230 to communicate the multiple IP addresses to a network interface of the client device 110 of LAN 103-1. The system 230 may provide the multiple IP addresses to the client device 110 using one of the standard IP configuration mechanisms, such as Dynamic Host Configuration Protocol version 4 ("DHCPv4"), Dynamic Host Configuration Protocol version 6 ("DHCPv6") or SLAAC ("Stateless Address Auto-Configuration"). In some implementations, in the case of SLAAC ("Stateless Address Auto-Configuration"), each IP address provided by system 230 to the client device 110 may be an intermediate form describing the subnet called a network prefix and may not be the final IP address assigned to the network interface and may not be used to send packets. The client device 110 may combine the network prefixes with a MAC address of the network interface using the SLAAC technique. The end result may be that the client will have multiple IP addresses for the network interface that are a part of each subnetwork assigned and provided by system 230.

At block 259, the memory resource 245 may store instructions 250 that may be executed by the processing resource 240 to cause the system 230 to receive a packet from the network interface of the client device 110 of the LAN 103-1, wherein the packet includes a source address that is one of the multiple IP addresses assigned to the client device 110.

At block 261, the memory resource 245 may store instructions 250 that may be executed by the processing resource 240 to cause the system 230 to select an external link of the plurality of external links based on the source address of the packet. In some implementations, the source address may be an IP address taken from the public address space allocated to a particular external link. In such implementations, the particular external link is selected. Additionally, or alternatively, the source address may be a private IP address selected or generated by the client device 110. In such implementations, selecting an external link may comprise an address translation component of the system 230 performing network address translation ("NAT") on the private IP address that is the source address of the packet. The address translation component may store a one to one conversion table between private IP addresses and public IP addresses that are a part of the address space allocated to the external links of the system 230. In such an example, the address translation component translates the private IP address that is the source address of the packet to a public IP address that is a part of the allocated space of one of the external links.

At block 263 the memory resource 245 may store instructions 250 that may be executed by the processing resource 240 to cause the system 230 to forward the packet via the external link of the plurality of external links that is selected by the system 230 based on the source address of the packet. The packet is thus forwarded to another local area network by system 230 using one of multiple paths through one of the multiple links available. In some implementations, forwarding the packet via the external link includes encapsulating the packet into a tunnel prior to forwarding the packet via an external link. The system 230 described above implements Multipath Transmission Control Protocol (MPTCP) that allows a client device 110 of LAN 103-1 to receive data from server 120 of LAN 103-3 with redundancy and increased bandwidth. In such a system 230, the client device 110 is aware of the multiple paths available to reach a destination.

Figure 3:
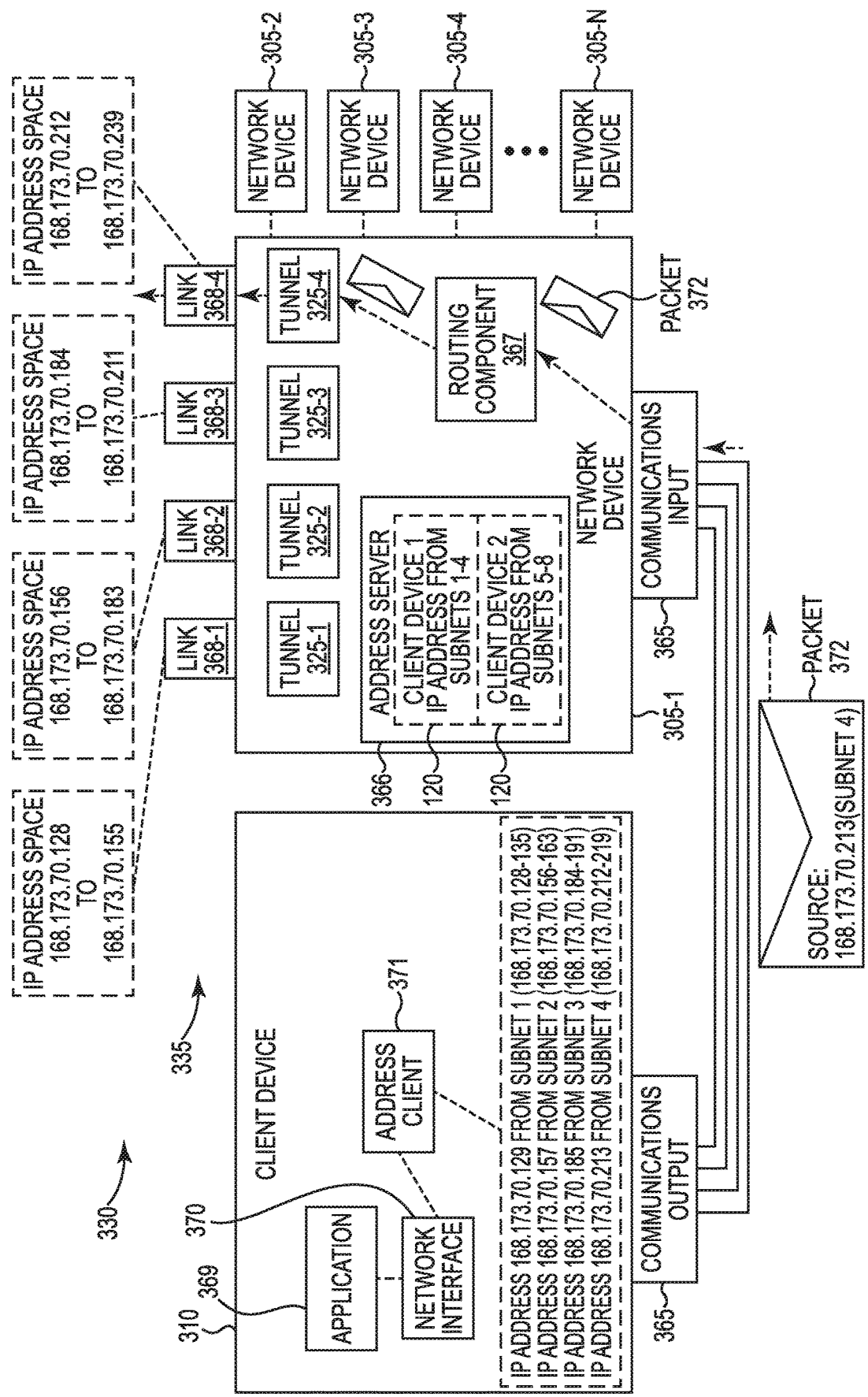
FIG. 3 illustrates an example of using multiple paths based on IP addresses from multiple subnetworks being assigned to a network interface of a client device consistent with the disclosure.

FIG. 3 is a diagram of an example system 330 relating to example system 230 shown in FIG. 2. FIG. 3 shows an example of forwarding a packet via an external link of a plurality of external links based on a source subnetwork of the packet.

As shown in FIG. 3, a system 330 includes a network 335 that includes a plurality of network devices 305-1, 305-2, 305-3, 305-4, . . . 305-N connected to at least one client device 310. Some implementations may include more or fewer than N network devices as shown in FIG. 3. The components of network device 305-1 are similar to the components of the other network devices 305-2 to 305-N. The network device 305-1 includes a communications input/output 365, an address server 366, a routing component 367, tunnels 125-1, 125-2, 125-3, and 125-4, and four external links 368-1, 368-2, 368-3, and 368-4 that connect the network device 305-1 to other networks. The communications input/output 365 may include devices to receive at least one ethernet line, at least one WLAN connection, and the like. The address server 366 may be a device capable of serving IP addresses to the client device 310 using DHCP4, DHCPv6, or SLAAC. The routing component may be a device capable of forwarding a packet based on a source or destination address. The tunnels 325-1 through 325-4 provide a path to the four external links 368-1 through 368-4, respectively. As further shown in FIG. 3, the system 330 includes the client device 310. In some implementations, the client device 310 may include an application 369 that runs a program, a network interface 370 that interacts with the rest of the network 335, and an address client 371 that is capable of receiving IP addresses from the address server 366.

Referring again to FIG. 3, the network 335 may be allocated a public IP address range for routing to the network 335. The public IP address range allocated to the network device 305-1 (which may include at least one network device) for routing to the network device 305-1 may be from 168.173.70.128 to 168.173.70.239. The network device 305-1 may partition this range into four equal IP address spaces, as an example, and allocate the four IP address spaces to the four external links 368-1 through 368-4, respectively. The first public IP address space allocated to the first external link 368-1 is 168.173.70.128 to 168.173.70.155, the second public IP address space allocated to the second external link 368-2 is 168.173.70.156 to 168.173.70.183, the third public IP address space allocated to the third external link 368-3 is 168.173.70.184 to 168.173.70.211, and the fourth public IP address space allocated to the third external link 368-4 is 168.173.70.212 to 168.173.70.239. In this way, each external link has an associated IP address space.

As further shown in FIG. 3 within the drawing for the address server 366, the network device 305-1 assigns multiple IP addresses, each taken from different subnetworks 1-4 to the network interface 370 of the client device 310. As further shown, the network device 305-1 may communicate information identifying the multiple IP addresses from subnetworks 1-4 to the address client 371 of the client 310. As further shown in FIG. 3 within the drawing for the client device 310, subnetwork 1 includes the range 168.173.70.128 through 168.173.70.135. As further shown, subnetworks 2, 3 and 4 correspond to other IP address ranges. As further shown, the network device 305-1 may receive a packet 372 from the network interface 370 of the client device 310. As an example, the packet 372 includes 168.173.70.213 as a source address. The source address 168.173.70.213 is a part of subnetwork 4 and is assigned to the network interface 370 of the client device 310. The packet 372 may be a packet governed by MPTCP such that the source address of the packet is selected from the multiple IP addresses of the network interface based on the MPTCP subflow that includes the packet. Optionally, there may be multiple subflows between the client device 310 and the network device 305-1, where one of the multiple subflows is chosen based on the source address of the packet.

As further shown, the routing component 367 of the network device 305-1 selects an external link of the plurality of external links based on the source address of the packet. In the illustrated example, the routing component 367 selects external link 368-4 because the source address 168.173.70.213 is a part of the public IP address space allocated to the fourth external link 368-4. The routing component 367 forwards the packet to the tunnel 325-4 that is associated with the fourth external link 368-4. As further shown, the network device 305-1 forwards the packet 372 via the external link 368-4 to a destination of the packet 372. In this way, assigning IP addresses from multiple subnetworks to a network interface of a client device allows packets from the client device to utilize multiple paths, thus increasing bandwidth and reducing disruption due to a disconnection in one external link.

A packet 372 destined for the client device 310 may be received by the system 330 in a manner analogous to the process described above except happening in reverse order. The network device 305-1 shown in FIG. 3 may receive an incoming packet 372 having a destination IP address via the external link 368 that is associated with the destination address. The network device 305-1 may select a client device 310 that has been assigned the destination address and may select a network interface 370 within the client device 310 based on which network interface 370 has been assigned the destination address.

Figure 4:
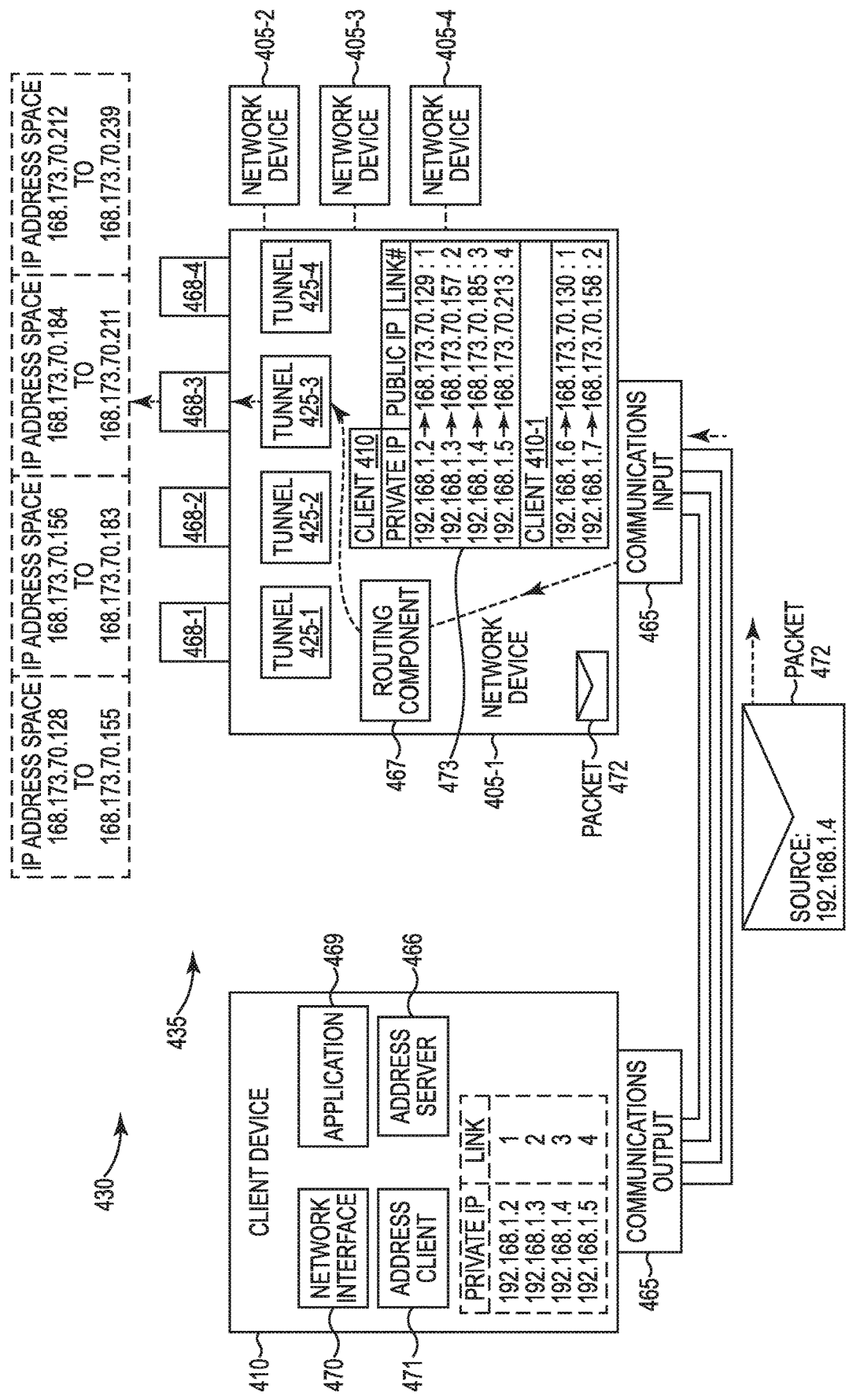
FIG. 4 illustrates an example of using multiple paths based on multiple private Internet Protocol ("IP") addresses being assigned to a network interface of a client device consistent with the disclosure.

FIG. 4 shows another implementation of using multiple IP addresses to utilize multiple paths corresponding to multiple external links. The system 430 of FIG. 4 is similar to the system 330 of FIG. 3, except that the client device 410 may select from multiple private IP addresses a private IP address to be a source IP address of the packet and the network device 405-1 translates, by using Network Address Translation ("NAT"), these private IP addresses to public IP addresses that are associated with one of the external links. The packet 472 is forwarded via the external link associated with the source address.

As shown in FIG. 4, a system 430 includes a network 435 that includes four network devices 405-1, 405-2, 405-3, and 405-4 connected to at least one client device 410. The components of network device 405-1 are similar to the components of the other network devices 405-2, 405-3, 405-4 . . . . The network device 405-1 includes a communications input 465, a routing component 467, tunnels 425-1, 425-2, 425-3, and 425-4, and four external links 468-1, 468-2, 468-3, and 468-4 that connect the network device 405-1 to other networks. The communications input 465 may include devices to receive at least one ethernet line, at least one WLAN connection, and the like. The routing component 467 may be a device capable of forwarding a packet based on a source or destination address. The tunnels 425-1 through 425-4 may provide a path to the four external links 468-1 through 468-4, respectively. As further shown in FIG. 4, the system 430 includes the client device 410. In some implementations, the client device 410 may include an address server 466 capable of serving IP addresses to the client device 410 using DHCPv4, DHCPv6, or SLAAC, an application 469 that is operable by a user for a particular purpose, a network interface 470 that is able to interact with the rest of the network 435, and an address client 471 that is capable of receiving IP addresses from the address server 466.

Referring again to FIG. 4, the network 435 may be allocated a public IP address range for routing to the network 435. The public IP address range allocated to the network device 405-1 (which may include at least one network device) for routing to the network device 405-1 may be from 168.173.70.128 to 168.173.70.239. The network device 405-1 may partition this range into four equal sized IP address spaces, as an example, and allocate the four IP address spaces to the four external links 468-1 through 468-4, respectively. The first public IP address space allocated to the first external link 468-1 is 168.173.70.128 to 168.173.70.155, the second public IP address space allocated to the second external link 468-2 is 168.173.70.156 to 168.173.70.183, the third public IP address space allocated to the third external link 468-3 is 168.173.70.184 to 168.173.70.211, and the fourth public IP address space allocated to the third external link 468-4 is 168.173.70.212 to 168.173.70.239. In this way, each external link has an associated IP address space. Although four equal sized IP address spaces are partitioned in this example, the IP address space may be partitioned into any number of variant sized spaces.

As further shown in FIG. 4 within the drawing for the client device 410, the network device 405-1 assigns multiple IP addresses in the form of private IP addresses 1-4 to the network interface 470 of the client device 410. As further shown in FIG. 4 within the drawing for the client device 410, the first private IP address is 192.168.1.2. As further shown, private IP addresses 2, 3 and 4 are also assigned. As further shown, the network device 405-1 may receive a packet 472 from the network interface 470 of the client device 410. As an example, the packet 472 includes 192.168.1.4 as a source IP address. Also, there may be multiple subflows between the client device 410 and the network device 405-1, where one of the multiple subflows is chosen based on the source address of the packet.

As further shown, the routing component 467 of the network device 405-1 selects an external link of the plurality of external links based on the source address of the packet. Specifically, the network device 405-1 includes an address translation component 473 capable of translating private IP addresses to a public IP address using a correspondence table, for example, translates the source address of the packet 472. Optionally, the client device 410 includes the address translation component 473 to carry out network address translation. In the illustrated example, the address translation component 473 translates 192.168.1.4 to 168.173.70.185. As further shown, the public IP address 168.173.70.185 is a part of the IP address space allocated to third external link 468-3. In the illustrated example, the routing component 467 selects external link 468-3 because the source address 192.168.1.4 translates to a public IP address that is a part of the public IP address space allocated to the third external link 468-3. The routing component 467 forwards the packet to the tunnel 425-3 that is associated with the third external link 469-3. As further shown, the network device 405-1 forwards the packet 472 via the external link 468-4 to a destination of the packet 472. In this way, assigning multiple private IP addresses to a network interface of a client device allows packets from the client device to utilize multiple paths, thus increasing bandwidth and providing increased redundancy to protect against disruption due to a disconnection in one external link.

A packet 472 destined for the client device 410-1 may be received by the system 430 in a manner analogous to the process described above except happening in reverse order. The system 430 may receive an incoming packet via one of the external links 468 shown in FIG. 4 based on which external link 468 is allocated an IP address space that includes the destination IP address of the packet 472. The network device 410 may select a client device 410 of a plurality of client devices based on which client device is associated with the destination IP address of the packet 472. Further, the network device 410 may translate the destination IP address from a public IP address to a private IP address used within the local area network to identify particular network interfaces of a client device. The network device 410 may select a network interface 470 of the chosen client device 410 in view of the private IP address that corresponds to the destination address of the incoming packet 472. The packet 472 is then forwarded to the selected network interface 470 of the client device 410 that is its destination.

Figure 5:
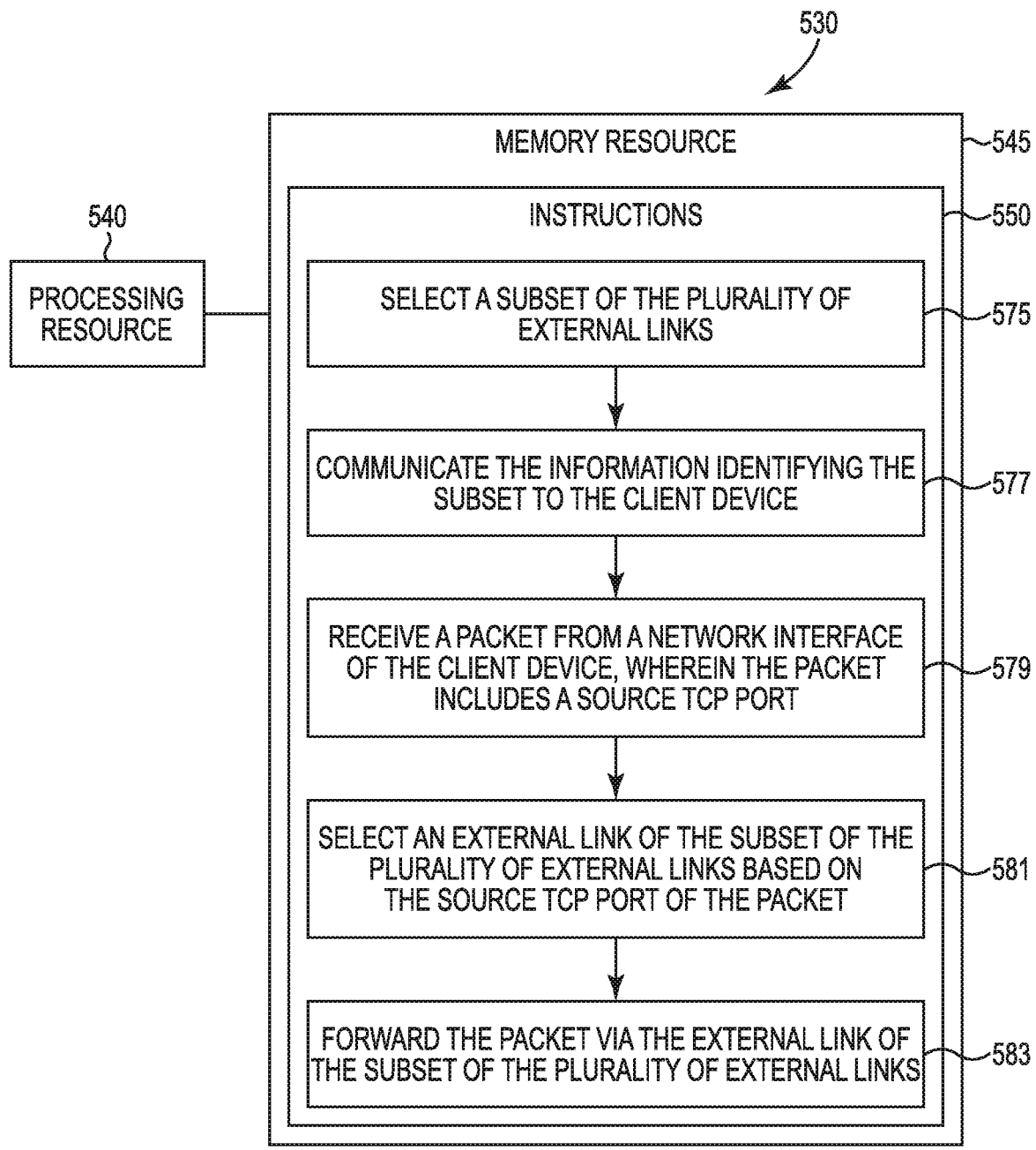
FIG. 5 illustrates another example of a system for using multiple paths for WAN consistent with the disclosure.

FIG. 5 illustrates an example of a system 530 consistent with the disclosure. The system 530 may include a network device 105-1, a client device 110, or a WAN 100 that includes a plurality of network devices 105 or client devices 110 arranged in a network topology. The network devices 105 (i.e., gateways, routers, switches, etc.) that are a part of the network 100 may be interconnected with one another by optical fiber, coax cable, LTE communication, Ethernet, or another method of communication. As shown in FIG. 5, the system 530 includes a processing resource 540 and a memory resource 545.

The memory resource 545 may store instructions 550 thereon. When executed by the processing resource 540, the instructions 550 may cause the system 530 to perform specific tasks and/or functions. For example, at block 575, the memory resource 545 may store instructions 550 which may be executed by the processing resource 540 to cause the system 530 to select a subset of a plurality of external links.

At block 577, the memory resource 545 may store instructions 550 that may be executed by the processing resource 540 to cause the system 530 to communicate the information identifying the subset of the external links to a network interface of the client device 110 of the LAN 103-1. Each external link of the subset of the plurality of external links is associated with a corresponding different TCP port number. Communicating the information identifying the subset may include the system 530 storing information associating each external link of the subset with a corresponding different TCP port number. The information associating the external links with the TCP port numbers may be stored by the system 530 on the client device 110 or the network device 105 and can be accessed by the client device 100 or the network device 105 when selecting an external link for forwarding a packet, as further described below.

At block 579, the memory resource 545 may store instructions 550 that may be executed by the processing resource 540 to cause the system 530 to receive a packet from a network interface of the client device 110 of the LAN 103-1 via a source TCP port. At block 581, the memory resource 545 may store instructions 550 that may be executed by the processing resource 540 to cause the system 530 to select an external link of the subset of the plurality of external links based on the source TCP port of the packet. Further, at block 583, the memory resource 545 may store instructions 550 that may be executed by the processing resource 540 to cause the system 530 to forward the packet via the external link of the subset of the plurality of external links. In this way, the system 530 forward a packet via one of plurality of external links based on a source TCP port of the packet, thereby allowing for greater redundancy because of the multiple paths that can be chosen to forward a packet from one network interface of a client device.

Figure 6:
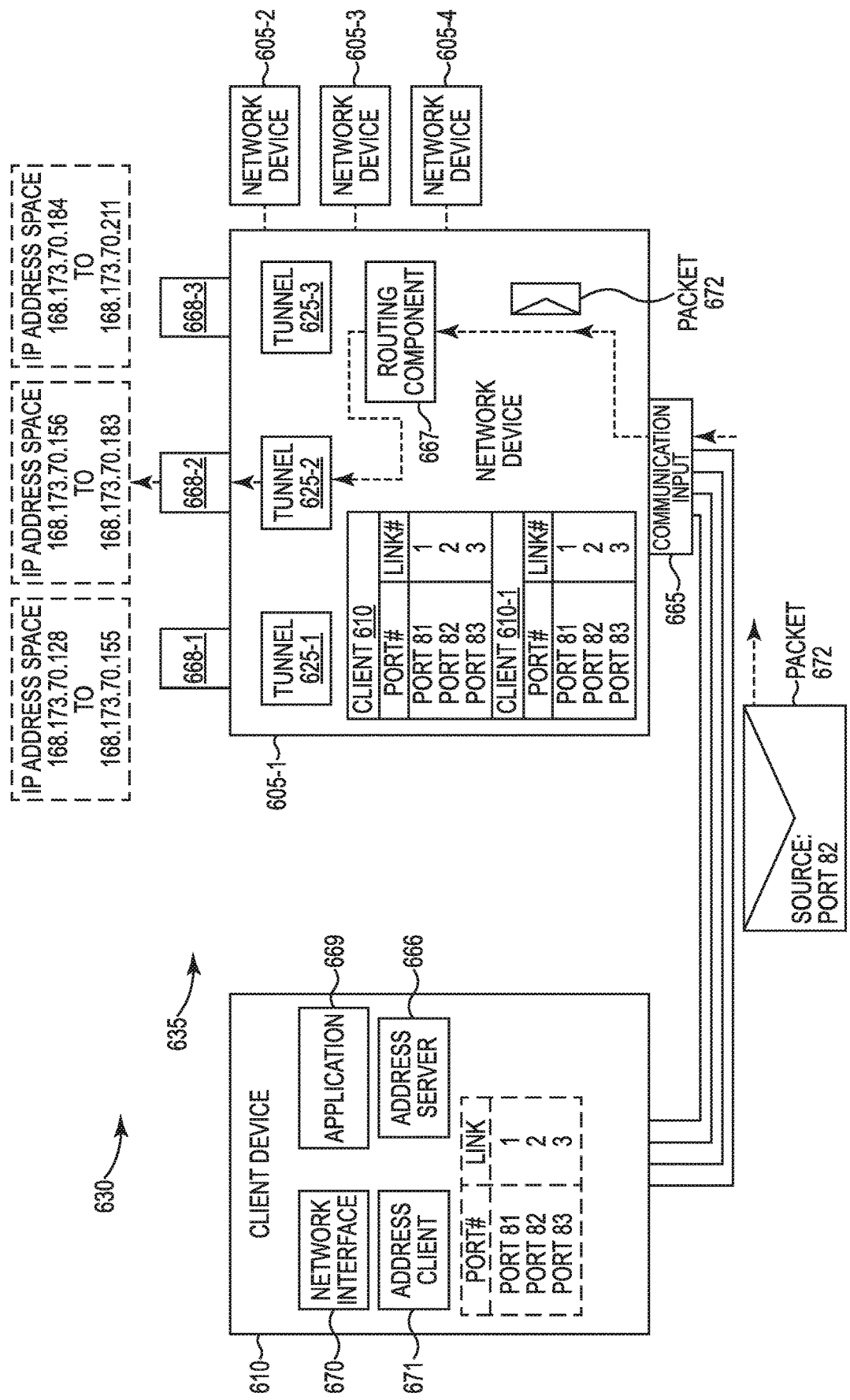
FIG. 6 illustrates an example of using multiple paths based on source Transmission Control Protocol ("TCP") numbers consistent with the disclosure.

FIG. 6 shows another implementation of using multiple paths corresponding to multiple external links. A system 630 of FIG. 6 is similar to the system 330 of FIG. 3, except that a packet 672 is forwarded via the external link associated with the source TCP port rather than a source IP address.

As shown in FIG. 6, a system 630 includes a network 635 that includes four network devices 605-1, 605-2, 605-3, and 605-4 connected to at least one client device 610. The components of network device 605-1 are substantially identical to the components of the other network devices 605-2, 605-3, 605-4 . . . . The network device 605-1 includes a communications input 665, a routing component 667, tunnels 625-1, 625-2, and 625-3 and three external links 668-1, 668-2, and 668-3 that connect the network device 605-1 to other networks. The network device 605-1 may include more than three external links but it may select a subset of the plurality of external links. In this example, the subset is the three external links 668-1, 668-2, and 668-3. The network device 605-1 may communicate information identifying the subset to the client device 610 so that the client device 610 is aware of the multiple paths available for forwarding the packet 672. The communications input 665 may include devices to receive at least one ethernet line, at least one WLAN connection, and the like. The routing component 667 may be a device capable of forwarding a packet based on a source or destination address. The tunnels 625-1 through 625-3 provide a path to the three external links 668-1 through 668-3, respectively. As further shown in FIG. 6, the system 630 includes the client device 610. In some implementations, the client device 610 may include an address server 666, an application 669 that is able to run a program, a network interface 670 that is able to interact with the rest of the network 635, and an address client 671 that is capable of receiving IP addresses from the address server 666.

Referring again to FIG. 6, the network 635 may be allocated a public IP address range for routing to the network 635. The public IP address range allocated to the network device 605-1 (which may include at least one network device) for routing to the network device 605-1 may be from 168.173.70.128 to 168.173.70.211. The network device 605-1 may partition this range into three equal IP address spaces, as an example, and allocate the three IP address spaces to the three external links 668-1 through 668-3, respectively. The first public IP address space allocated to the first external link 668-1 is 168.173.70.128 to 168.173.70.155, the second public IP address space allocated to the second external link 668-2 is 168.173.70.156 to 168.173.70.183, the third public IP address space allocated to the third external link 668-3 is 168.173.70.184 to 168.173.70.211. In this way, each external link has an associated IP address space. Although three equal sized IP address spaces are partitioned in this example, the IP address space may be partitioned into any number of variant sized spaces with each partition of IP address space associated with a specific external link.

As further shown, the network device 605-1 may receive a packet 672 from the network interface 670 of the client device 610. As an example, the packet 672 includes TCP Port number 82 as a source TCP Port. Optionally, there may be multiple subflows between the client device 610 and the network device 605-1, where one of the multiple subflows is chosen based on the source TCP Port of the packet. In some implementations, the packet 672 may be a packet governed by multipath transmission control protocol such that the source transmission control protocol port of the packet 672 is selected based on the multipath transmission control protocol subflow that includes the packet 672.

As further shown, the routing component 667 of the network device 605-1 selects an external link of the plurality of external links based on the source TCP port of the packet. This is made possible by a one-to-one association between a TCP port of a particular network interface 670 and a corresponding one of the external links 668-1 through 668-3, as shown in the drawing for client device 610. This association between TCP port numbers and external links may be stored on the client device 610 or the network device 605-1. In the illustrated example, the routing component 667 selects external link 668-2 because the source TCP Port 82 is associated with the second external link 668-2. The routing component 667 forwards the packet to the tunnel 625-2 that is associated with the second external link 668-2. As further shown, the network device 605-1 forwards the packet 672 via the second external link 668-2 to a destination of the packet 672. In this way, source TCP port numbers of a packet from a network interface of a client device allows packets from the client device to utilize multiple paths, thus increasing bandwidth and providing increased redundancy to protect against disruption due to a disconnection in one external link. A packet 672 destined for the client device 610-1 may be received by the system 630 in a manner analogous to the process described above except happening in reverse order.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A system comprising a set of network devices in a software defined wide area network (SD-WAN) topology, the SD-WAN topology having a plurality of external links that connect to other networks, wherein the system comprises a processing resource to:
   assign multiple internet protocol addresses to one of the network interfaces of a client device;
   communicate the multiple internet protocol addresses to a network interface of the client device;
   receive a packet from the one of the network interfaces, wherein the packet includes a source address that is one of the multiple internet protocol addresses;
   determine a path of a set of SD-WAN paths selected by the client device and communicated to the set of network devices via the source address of the packet;
   select an external link of the plurality of external links based on the determined path, wherein each link of the plurality of external links is associated with one of a corresponding set of public internet protocol address spaces allocated for routing from sources external to the SDWAN topology, the set of public internet protocol address spaces being partitioned into a plurality of subnetworks, wherein the multiple internet protocol addresses include internet protocol addresses each belonging to different subnetworks of a different external link, and wherein selecting the external link includes selecting the external link based on a subnetwork of the source address; and
   forward the packet via the external link of the plurality of external links.

2. The system of claim 1, wherein the processing resource further executes instructions to encapsulate the packet into a tunnel prior to forwarding the packet via the external link.

3. The system of claim 1, wherein assigning the multiple internet protocol addresses to the network interface includes using one of dynamic host configuration protocol version four, dynamic host configuration protocol version six, or stateless autoconfiguration.

4. The system of claim 1, wherein the processing resource further executes instructions to perform network address translation prior to forwarding the packet via the external link.

5. The system of claim 4, wherein the multiple internet protocol addresses are private internet protocol addresses of a local area network of the client device.

6. The system of claim 1, wherein the packet is a first packet, wherein the processor further executes instructions to receive a second packet from outside the network.

7. The system of claim 6, wherein the external link is a first external link and the client device is a first client device, wherein the processor further executes instructions to route the second packet via a second external link to a network interface of a second client device based on a destination address of the second packet.

8. The system of claim 7, wherein the processor further executes instructions to perform network address translation on the second packet prior to routing the second packet to the network interface of the second client device.

9. The system of claim 1, wherein the packet is a packet governed by multipath transmission control protocol such that the source address of the packet is selected from the multiple internet protocol addresses of the network interface based on the multipath transmission control protocol subflow that includes the packet.

10. A software defined wide area network (SD-WAN) comprising a set of network devices, the SD-WAN having a plurality of external links, wherein the network comprises a processing resource to:
    select a subset of the plurality of external links;
    communicate information identifying the subset to a network interface of the client device;
    receive a packet from a network interface of the client device, wherein the packet includes a source transmission control protocol port;
    determine a path of a set of SD-WAN paths selected by the client device and communicated to the set of network devices via the source transmission control protocol port of the packet;
    select an external link of the subset of the plurality of external links based on the determined path, wherein each link of the plurality of external links is associated with one of a corresponding set of public internet protocol address spaces allocated for routing from sources external to the network, the set of public internet protocol address spaces being partitioned into a plurality of subnetworks, wherein the multiple internet protocol addresses include internet protocol addresses each belonging to different subnetworks of a different external link, and wherein selecting the external link includes selecting the external link based on a subnetwork of the source address; and
    forward the packet via the external link of the subset of the plurality of external links.

11. The network of claim 10, wherein each external link of the subset of the plurality of external links is associated with a corresponding different transmission control protocol port number.

12. The network of claim 10, wherein selecting the external link for forwarding a packet includes accessing the information associating each external link of the subset with a corresponding different transmission control protocol port number.

13. The network of claim 10, wherein the packet is a packet governed by multipath transmission control protocol such that the source transmission control protocol port of the packet is selected based on the multipath transmission control protocol subflow that includes the packet.

14. A non-transitory machine-readable medium storing instructions executable by a processing resource to:
    assign a plurality of internet protocol addresses to a network interface of a client device;
    communicate information identifying the plurality of internet protocol addresses to a network interface of the client device;

receive a packet originating from the network interface, wherein the packet includes a source address that is one of the plurality of internet protocol addresses;

determine a path of a set of SD-WAN paths selected by the client device and communicated to the set of network devices via the source address of the packet, the SD-WAN paths belonging to a SD-WAN topology having a plurality of external links connecting to other networks;

select an external link of the plurality of external links that is associated with the determined path, wherein each link of the plurality of external links is associated with one of a corresponding set of public internet protocol address spaces allocated for routing from sources external to the SDWAN topology, the set of public internet protocol address spaces being partitioned into a plurality of subnetworks, wherein the multiple internet protocol addresses include internet protocol addresses each belonging to different subnetworks of a different external link, and wherein selecting the external link includes selecting the external link based on a subnetwork of the source address; and forward the packet via the external link of the plurality of external links to a destination external to a network of the client device.

15. The non-transitory machine-readable medium of claim 14, wherein the non-transitory machine-readable medium of claim 14 is a component of a network device, the network device being one of a gateway, a router, and a switch.

16. The non-transitory machine-readable medium of claim 14, wherein assigning a plurality of internet protocol addresses include selecting internet protocol addresses using one of dynamic host configuration protocol version four and dynamic host configuration protocol version six.

17. The non-transitory machine-readable medium of claim 14, wherein the machine-readable medium further stores instructions executable by the processing resource to perform network address translation on the packet prior to forwarding the packet.

18. The non-transitory machine-readable medium of claim 17, wherein the plurality of internet protocol addresses are private internet protocol addresses of the client device.

* * * * *